June 6, 1967 J. E. HANLE ETAL 3,323,965
ART OF LAMINATING DISSIMILAR MATERIALS
Filed Aug. 18, 1964 2 Sheets-Sheet 1
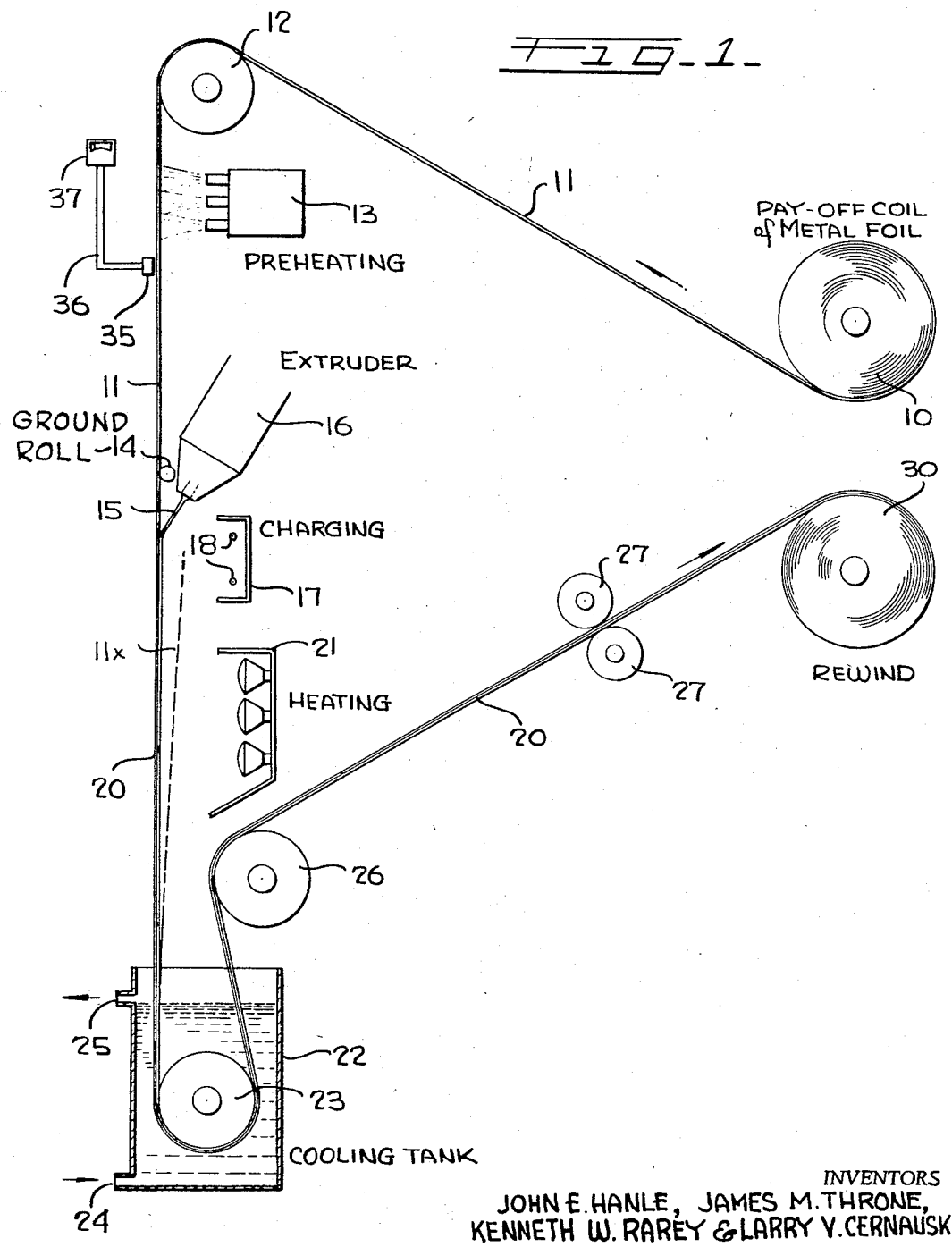
INVENTORS
JOHN E. HANLE, JAMES M. THRONE,
KENNETH W. RAREY & LARRY V. CERNAUSKAS
BY
Mason, Porter, Diller & Stewart
ATTORNEYS

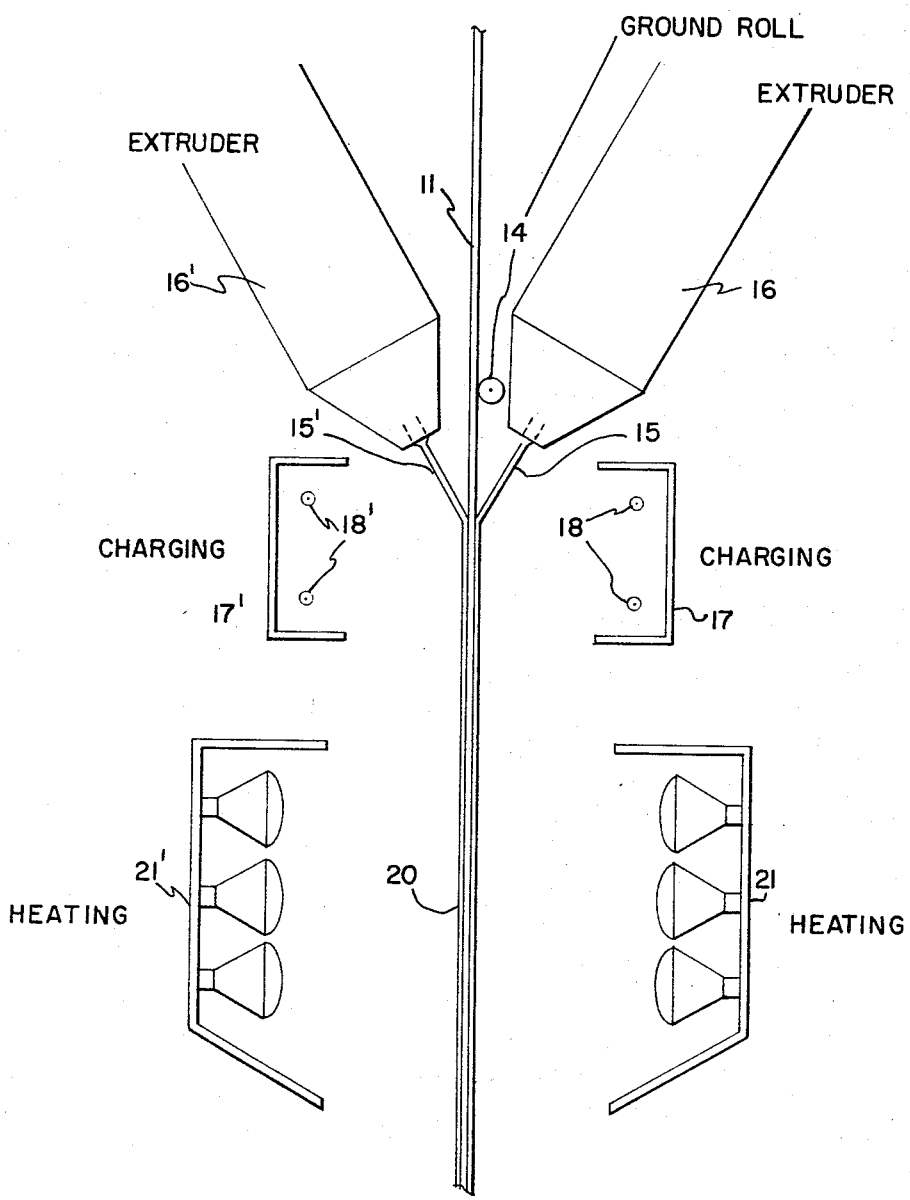

United States Patent Office 3,323,965
Patented June 6, 1967

3,323,965
ART OF LAMINATING DISSIMILAR MATERIALS
John E. Hanle, Hinsdale, James M. Throne, Country Club Hills, Kenneth W. Rarey, South Holland, and Larry V. Cernauskas, Chicago, Ill., assignors to Continental Can Company, Inc., New York, N.Y., a corporation of New York
Filed Aug. 18, 1964, Ser. No. 390,784
3 Claims. (Cl. 156—244)

This application is a continuation-in-part of our copending application Ser. No. 321,752, filed Nov. 6, 1963 and now abandoned.

This invention relates to the art of producing laminated products from dissimilar materials by the employment of electrostatic forces to assure strong bonds between the plies of materials.

It is known to combine two or more materials, usually in the form of thin sheets, and to provide such sheets of dissimilar materials so that the unitary product will exhibit the advantageous properties of each component. Such products are often referred to as "laminates" or "laminations."

It has been a practice to apply resistive coatings to metals. When paints and enamels are so employed, a solvent or dispersant is present to permit spreading; and the cost is increased by the price of the solvent and the labor and overhead costs of preparing the liquid for application and of later expulsion of the solvent or dispersant, noting that fume disposal is frequently necessary to avoid personnel and fire hazards. In many cases, the solids are not present in final chemical form, and a later heating is employed for curing. Endeavors have therefore been made to apply coatings to substrates without the employment of substances which must later be expelled or converted. Thus, thermoplastics have been heated to fusion, and rolled onto metal: wherewith the rollers, in pressing the plastic into contact with the metal operate for only short periods of time, and can cause irregularities in coating thicknesses. When the thermoplastic is not heated to fusion, the bond has been unsatisfactory unless the surface of the thermoplastic has been pretreated to effect bonding. It has also been proposed to employ adhesives to establish the bond, wherewith the plastic is not heated to a temperature at which it is significantly softened: but therewith the choice of adhesives is highly limited, and the costs of materials and procedures are increased.

Thus, a web of moisture-proofed cellophane, i.e., regenerated cellulose, has been laminated to a paper web by use of a water-based adhesive; therewith the cellophane ply or layer affords resistance to water vapor transmission and the paper ply or layer provides stiffness and opacity. The method and apparatus employed basically comprise unwinding the webs of the materials, applying adhesive to one or both webs, bringing the webs together at suitable conditions of temperature and pressure, heating or cooling as required by the nature of the adhesive, and rewinding. The web of cellophane is preformed by extrusion or casting procedures.

Another class of laminates is prepared by extruding a molten plastic and bringing the extruded film, while still hot, onto a solid second web under appropriate conditions of temperature and pressure. Usually the temperatures and pressure are so controlled so that no separate adhesive is required. Such operations are often referred to as "extrusion-lamination" and "extrusion coating." Although inherently simpler than preparing a laminate by the first stated procedure, control is more difficult because the work is accomplished over a narrow range of related conditions, particularly the initial contact of the the still-molten extruded plastic film and the moving second web. Pressure and temperature are important, but the procedure is also time-dependent both as to temperature effects at various points in the process, and because of the effects on the draw ratio, on the amount of neck-in, in the thickness and on other attributes of the plastic film. Thus, it has been found particularly troublesome and difficult to form extrusion laminates with materials such as polyethylene onto metal coil stock.

In both procedures, it has been the practice to apply the pressure by passing the plies, while in contact, between pressure rolls. If the temperature is sufficient to make the plastic tacky for its adhesion to the other ply, then it also tends to adhere to the contacted pressure roll, with development of surface defects. This condition is particularly evident when the contacted roll has a rubber jacket. The condition continues until the laminate assembly has cooled below the deformation temperature. Hence, the use of chilled rolls for each cooling is undesirable. Also, the movement of the plies between the rollers must be matched, particularly when the plastic has been softened by heat, to avoid variations of thickness due to flow of the soft material under roller pressure.

It has been found that the pressure effects and all-over contact at the interface can be produced by electrostatic charges and therewith a satisfactory and maintainable bonding strength attained between the hot thermoplastic and hot metal.

One of the plies or components of the laminate must be sufficiently non-conductive so that it can acquire and retain an electrostatic charge through the critical points of the process. Materials are suitable which exhibit, in a molten condition, volume resistivities of about at least $10^5$ ohm-cm. Such materials are capable of accepting and retaining the necessary electrostatic charges. Thus most common so-called plastics, including synthetic resins, can be employed; such as polyethylene of low, medium, and high density; polypropylene and other polyolefins including copolymers of olefins and other monomers; vinyl-chloride copolymers; polyvinylidene chloride, polystyrenes, polyethylene glycol terephthalate and copolymers thereof, cellulose acetate, various halogenated polymers including polytetrafluoroethylene, poly-vinyl formal, polyacetals, and polycarbonates. Commercially available forms of such plastics can be processed according to this invention over a wide range of relative humidity.

Another component or ply of the laminate must be electrically conductive. In practice, materials exhibiting volume resistivities of $10^{-6}$ ohm-centimeter or below perform excellently. All common metals in the form of foils and heavier sheet and coil stocks meet the requirement.

It has been found possible to prepare metal and plastic laminates with the plastic having thicknesses of 0.5 to 5 mils and higher.

One employment of the procedure is the preparation of metal and plastic laminate sheets for forming containers for alimentary substances which must be subjected to pasteurizing temperature without liability of detachment or perforation of the coatings. For such uses, linear polyethylene has been found satisfactory at 8 milligrams per square inch. A tinplate coil strip coated on both sides with low density polyethylene has been fabricated to form can structures; there was good adhesion even on uncleaned strip stock having residual rolling oil; and the structures underwent pasteurization without loss of adhesion of the coating plies.

An illustrative practice of this invention is shown by the accompanying drawings in which:

FIGURE 1 is a diagrammatic illustration of an apparatus for carrying the invention into effect; and FIGURE 2 is a diagrammatic illustration enlarged of the section of the apparatus wherein the molten film is simultaneously extruded on both sides of a moving conductive core.

A coil 10 of metal web stock, e.g., tinplate, delivers the strip 11 which passes over an idler turning roll 12, and thence moves past a preheating device 13, illustratively a gas burner. The strip passes in contact with a ground bar 14, and then receives the film 15 of thermoplastic material shortly after the film issues from an extruder 16. The extrusion die is arranged to deliver the film at an acute angle to the moving strip 11. An electrostatic charging device 17, illustratively having a plurality of bars 18 at a high potential difference relative to the ground bar 14 and the general machine frame and ground, delivers electrical charges to the surface of the passing plastic film, these charges being of opposite polarity to the induced charges on the strip 11 so that they are active through the plastic film to cause it to move into tight and continuous engagement with the surface of the strip. The laminate 20 composed of the metal strip 11 and the electrostatically adherent plastic film 15 attains a strong bond at its interface when the metal and plastic are at the extrusion temperature of the thermoplastic. A time function appears involved, and the temperature may be maintained by appropriate means such as jackets or the like to prevent heat loss, or by a further heating device 21, illustratively a bank of infra-red lamps, noting that the plastic and metal are not brought into contact with any body except each other, so that no heat loss occurs except by radiation and air convection and there is no physical contact of a third body for producing a pressure upon them. The composite laminate, with the plies strongly bound, is passed through a cooler 22, illustratively a water tank supplied with cooling water by a pipe 24 with discharge of heated water by a pipe 25. Thus, there is no contact of the laminate by a solid third body while the plastic is in a heat-softened and easily deformable state. After the chilling by the water, the form-maintaining laminate can be passed around an idler turning roll 23 and thence over a drive roll 26 and between the rubber-surfaced pinch rolls 27 which act as a speed control, and then is rewound as a coil 30.

The invention has also been practiced with use of a chilling roll in open air, located at a distance from the point of initial contact of the metal strip and the molten thermoplastic film adequate for the hot thermoplastic material to conform to the substrate strip and for the interface molecules of the thermoplastic material to orient themselves to effect the bonding.

It is preferred to provide a device for determining the temperature of the preheated metal strip, such as a thermocouple 35 with conductors 36 leading to a meter 37. Therewith the metal strip can be brought to a temperature at which the thermoplastic will be soft and able to conform to the metal, and high enough so that there is no chilling heat shock at the contact nor such a high temperature that the metal is degraded, e.g., by the melting of the tin of tinplate, the annealing loss of temper with aluminum and its alloys, or by degrading the thermoplastic at the time of contact.

The ground bar 14 has a guiding function for the metal strip 11, and may be formed as an idler roller. The action of the charges, on the plastic film 15, causes the latter to move toward the metal strip 11, and the spacing of the metal strip 11 from the extruder lips should be maintained. Hence it is preferred to locate the ground bar in the nip between the film 15 and the strip 11, so that this bar acts mechanically to maintain the proper juxtaposition of the strip relative to the extruder die against mechanical tensions on the strip.

In practice, the charging device 17 may be made positive or negative in polarity relative to the ground bar 14.

The position of the charging device 17 relative to the plastic film permits control of the electrostatic forces between metal strip and plastic film, for a given potential difference between the corona producing electrodes 14, 18. Contact of the electrodes 18 and the film is not necessary. Distances of ⅛ to 2 inches have been satisfactory. The electrodes 18 may be formed as one or more electrically connected, sharpened metal rods, for example of 1/16 inch diameter steel, positioned perpendicular to the film; or one or more fine wires secured in spaced relation to the film, transverse to the direction in which the film is travelling. In the latter case, wires from 1 to over 5 mils diameter have been used, at a spacing of at least several diameters.

The voltage imposed across the bars or electrodes 14, 18 typically is in the range of 4 to 15 kilovolts. Both alternating and direct current potentials have been used, with preference for direct current because higher and steadier forces then appear to be present. Preferably the operation is under voltage and spacing conditions such that no visible corona, and no flashing noisy discharge occurs. Therewith, the current requirements are small, around one milliampere or less for webs 36 inches wide and travelling around 20 feet per minute. The electrostatic force is a function not only of the voltage; but also of the shape and size of the charging bars 18, the distance from the plastic film, the distance from the conductive member, the thickness of the plastic, its ohmic resistance and dielectric constant at the operating temperature, moisture content and relative atmospheric humidity, and other factors. Forces of the order of 17 pounds per square inch (p.s.i.), acting normal to the surface, have been found to exist between a polyethylene film of one mil thickness and a smooth metal surface, employing a potential of 8300 volts and a bar distance of about 0.3 inches, the measurement being made at 50 percent relative humidity and 73 degrees F. Potentials in excess of 1000 volts have been measured between the opposite surfaces of the polyethylene.

Both sides of the conductive member, illustratively the tinplate strip 11, may be coated successively or simultaneously. Thus, aluminum and other metal foils, tin plates, and similar conductive materials can be coated on one or both surfaces. As illustrated in FIGURE 2, the strip 11 passes in contact with a ground bar 14 and then receives the thermoplastic film 15 and 15' simultaneously on both sides of the strip shortly after the film issues from the extruders 16 and 16'. Electrostatic charging devices 17 and 17' illustratively having a plurality of bars 18, 18' at a high potential difference relative to the ground bar 14, electrostatically charge both films 15, 15' with a charge of opposite polarity to the induced charges on the strip 11 so that the films are caused to move into tight and continuous engagement with the surface of the strip 11, forming a laminate 20 composed of a central core 11 coated on both sides with films 15, 15'. The temperature of the laminate 20 is maintained by further heating both sides of the laminate with banks of infra-red lamps 21, 21'. The procedure may also be used to coat a preformed laminate consisting of multiple metal plies separated by conductive or nonconductive intermediate plies.

When alternating current is employed, successive areas along the length of the advancing laminate may have successively opposite polarities of charge on the plastic.

EXAMPLE 1

Employing an apparatus having a metal strip supply, an extruded and a charging device as in the drawing, a strip of commercial 0.25 lb. electro-tinplate, 4 inches wide, was moved vertically downward at 20 feet per minute and preheated to about 425 degrees F. The extruder received an extrusion grade of polyethylene with a density of 0.923 and a melt index of 3.7 (the resin commercially available under the trademark Alathon–16 was used), which was extruded as a molten film about 20 mils thick at the extruder lips, with employment of extruder barrel and die temperatures of 560 degrees F. The extruder die lips were about 7/16 inch perpendicularly from the surface of the passing metal strip. The die lips were about 9½ inches from a chill roll here employed in lieu of the cooling tank 22. The charging device 17 had three wires about 6½ inches long extending across the width of the film and located about one inch from the metal strip; the wires were of 3 mil diameter platinum.

When operated without an electrostatic potential between the electrodes, the film assumes a path straight from the extruder lips to the chilling roll, as indicated by the dash line 11x in the drawing. Adhesion was poor: the plastic was easily peeled from the metal.

When 12 kilovolts was employed as charging potential, the charges caused the molten plastic film to make contact with the metal strip about one inch below the horizontal level of the die lips. Excellent adhesion resulted.

By adjusting the speed of the metal strip relative to that of the film issuing from the extruder lips, a "draw down" of about 20 to 1 was obtained. That is, when the lip spacing was 20 mils, the plastic lamination ply on the completed assembly was about one mil. Thus when the extruder is operated at optimum conditions of temperature and pressure for forming the extrudate, illustratively 20 mils thick, the final thickness of the resin coating on the metal strip can be regulated by the speed of the metal strip, illustratively having it move twenty times as fast as the emerging extrudate.

The optimum position for the extruder, by which the angle of the emerging extrudate relative to the path of the metal strip is determined, and depends upon the position of the charging device 17, the voltage used, the speed of the metal strip, and the angle of the strip relative to the pull of gravity. Thus, if the illustrative charging wires 18 are close to the strip, a lower voltage can be employed than if they are more distant.

In further practice with the apparatus of Example 1, the ground bar 14 was 5/16 inches in diameter and spaced so its lower surface was 5/8 inches above the level of the extruder lips. Two horizontal wires 18 were employed, spaced parallel to the path of the metal strip and at a distance of 1½ inches; the wires being of 3 mil diameter platinum and about 13/16 inches apart, with the upper wire 5/8 inches below the extruder lips. The extruder was positioned so that the film came forth downwardly at an angle of about 55 degrees relative to the path of the metal strip, with the film emerging parallel to the die lands.

The procedure assures that the plastic is held tightly in continuous, over-all contact with the metal while still molten and for an extended time, without requiring the contact of squeeze or other rolls with the plastic film at a temperature for fusion bonding to the metal and without interrupting the action of the forces which produce the contact and bonding.

EXAMPLE 2

Employing an apparatus having a metal strip supply, an extruder, and a charging device as in the drawing, a strip of commercial 10 mil tinplate 6 inches wide, was moved vertically downward at 20 feet per minute and preheated to about 380 degrees F. The extruder received an extrusion grade of polypropylene with a melt index of about 160 (the resin commercially available under the trademark Escon CD 112 was used), which was extruded as a molten film about 20 mils thick at the extruded lips, with employment of extruder barrel and die temperature of 570 degrees F. The extruder die lips were about 7/16 inch perpendicularly from the surface of the passing metal strip. The die lips were about 30 inches from the cooling tank 22. The charging device 17 had three wires about 6½ inches long extending across the width of the film and located about one inch from the metal strip: the wires were of 3 mil diameter platinum.

EXAMPLE 3

Employing an apparatus having a metal strip supply, an extruder, and a charging device as in the drawing, a strip of commercial 10 mil tinplate 6 inches wide, was moved vertically downward at 20 feet per minute and preheated to about 400 degrees F. The extruder received a pelletized copolymer of 15% ethylene glycol isophthalate and 85% ethylene glycol terephthalate (the resin commercially available under the trademark Vitel 409 was used), which was extruded as a molten film about 20 mils thick at the extruder lips, with employment of extruder barrel and die temperature of 360 degrees F. The extruder die lips were about 7/16 inch perpendicularly from the surface of the passing metal strip. The die lips were about 30 inches from the cooling tank 22. The charging device 17 had three wires about 6½ inches long extending across the width of the film and located about one inch from the metal strip; the wires were of 3 mil diameter platinum.

The laminate of Examples 2 and 3 showed excellent adhesion.

An as-rolled aluminum alloy coil stock of 18 mils thickness was coated, by employment of electrostatic forces as described above, with a low density polyethylene (the resin commercially available under the trademark Alathon–1540 was used) in film thicknesses of 1½, 3, and 6 mils with coating at one side only; and with film thicknesses of 1½ and 1½, 3 and 3, and 2 and 4 mils with applications of two sides. Commercially satisfactory adhesion was attained.

The same aluminum stock was similarly coated with high density polyethylene (the resin commercially available under the trademark Alathon–7250 was used) in thicknesses of 3 mils at one or both sides. Satisfactory adhesion was produced.

Correspondingly commercial tinplate stock for cans (specified as 107#–MCT6– 0.25 lb. tinplate) was coated with low, medium and high density polyethylenes, and fabricated into beer can ends. The metal was preheated to 420±10 degrees F. When the temperature of the extruded film as measured by a needle point thermometer as the film emerged from the die was 375 degrees F., the adhesion was insufficient and the film peeled easily. When the extrusion temperature was 435 degrees F., peeling was difficult. At 460 degrees F. the adhesion effect was very high. In this work, the metal strip was fed at 17 to 20 feet per minute.

Low and medium density polyethylenes have been employed for extrusion coating, with electrostatic charging for over-all contact of metal strip and plastic film, at film thicknesses of ½, ¾ and one mil: and with high density polyethylenes at the same thicknesses and also at 2 mils. Adhesion was satisfactory.

The illustrative practices are not restrictive; and the invention may be practiced in many ways within the scope of the appended claims.

What is claimed is:

1. A method of forming a laminated structure having an electrically conductive core and layers of thermoplastic insulating material adherent to opposite faces thereof, said insulating material being capable of acquiring and retaining a non-conductive state when in a molten condition and capable of fusion bonding to the core, which comprises preheating the conductive core to a temperature at which the material for the insulating layers is thermoplastic, establishing electrostatic fields at the opposite faces of the core, extruding the molten insulating material into sheets, and simultaneously presenting the same in said electrostatic fields and at opposite faces of the core whereby electrostatic charges become resident in said sheets, wherewith said sheets are moved by the charges and fields into intimate contact with opposite faces of the core, and maintaining the contacting sheets and core at a temperature above the fusion bonding temperature of the layer material until the sheets and core have bonded together.

2. The method of claim 1 wherein the non-conductive sheet is formed from at least one of the materials selected from the group consisting of polyolefins, vinyl chloride copolymers, polyvinylidene chloride, polystyrene, polyethylene glycol terephthalate, polyethylene glycol terephthalate copolymers, cellulose acetate, polytetrafluoroethylene, poly-vinyl formal, polyacetals, and polycarbonates.

3. The method of claim 1 wherein the conductive core is a metal strip.

References Cited
UNITED STATES PATENTS

| | | | |
|---|---|---|---|
| 2,944,586 | 7/1960 | Yanulis | 156—498 |
| 3,047,934 | 8/1962 | Magner | 156—322 |
| 3,054,708 | 9/1962 | Steinberg | 156—1 |
| 3,075,868 | 1/1963 | Long | 156—82 |
| 3,196,063 | 7/1965 | Paquin et al. | 161—250 |

EARL M. BERGERT, *Primary Examiner.*

T. R. SAVOIE, *Assistant Examiner.*